(12) United States Patent
Zhang et al.

(10) Patent No.: US 10,113,788 B2
(45) Date of Patent: Oct. 30, 2018

(54) REFRIGERATOR DRAWER AND REFRIGERATOR

(71) Applicants: HEFEI HUALING CO., LTD., Hefei (CN); HEFEI MIDEA REFRIGERATOR CO., LTD., Hefei (CN)

(72) Inventors: Yuefeng Zhang, Hefei (CN); Xiuhua Geng, Hefei (CN); Yuan Sun, Hefei (CN); Haixing Zhang, Hefei (CN)

(73) Assignees: HEFEI HUALING CO., LTD., Hefei (CN); HEFEI MIDEA REFRIGERATOR CO., LTD., Hefei (CN)

( * ) Notice: Subject to any disclaimer, the term of this patent is extended or adjusted under 35 U.S.C. 154(b) by 0 days.

(21) Appl. No.: 15/510,411

(22) PCT Filed: Nov. 28, 2014

(86) PCT No.: PCT/CN2014/092578
§ 371 (c)(1),
(2) Date: Mar. 10, 2017

(87) PCT Pub. No.: WO2016/037420
PCT Pub. Date: Mar. 17, 2016

(65) Prior Publication Data
US 2017/0261254 A1    Sep. 14, 2017

(30) Foreign Application Priority Data

Sep. 11, 2014    (CN) .......................... 2014 1 0462032

(51) Int. Cl.
*A47B 88/95*    (2017.01)
*F25D 25/02*    (2006.01)
(Continued)

(52) U.S. Cl.
CPC ............ *F25D 25/025* (2013.01); *A47B 88/00* (2013.01); *A47B 88/95* (2017.01); *F25D 11/02* (2013.01);
(Continued)

(58) Field of Classification Search
CPC ...... F25C 25/025; F25C 23/028; F25C 23/04; F25C 11/02; A47B 88/95; A47B 88/944;
(Continued)

(56) References Cited

U.S. PATENT DOCUMENTS 5,040,856 A * 8/1991 Wilkins ................ F25D 25/025
312/334.21
5,437,503 A * 8/1995 Baker ................... F25D 25/025
312/348.4
D384,681 S * 10/1997 Martin .......................... D15/89
(Continued)

FOREIGN PATENT DOCUMENTS

CN    202403486 U    8/2012
CN    202432804 U    9/2012
(Continued)

OTHER PUBLICATIONS

PCT/2014/092578 English translation of the International Search Report and Written Opinion dated Jun. 12, 2015, 10 pages.

*Primary Examiner* — Janet M Wilkens
(74) *Attorney, Agent, or Firm* — Lathrop Gage LLP

(57) ABSTRACT

A refrigerator drawer and a refrigerator are provided. The refrigerator drawer includes a drawer body (1), in the shape of a box having a front opening and an upper opening; and a baffle (2), fitted with the drawer body (1) through a detachable snap structure.

5 Claims, 4 Drawing Sheets

(51) Int. Cl.
*A47B 88/00* (2017.01)
*F25D 11/02* (2006.01)

(52) U.S. Cl.
CPC ........ *F25D 25/02* (2013.01); *A47B 2088/951* (2017.01); *A47B 2210/175* (2013.01)

(58) Field of Classification Search
CPC ........ A47B 2088/951; A47B 2210/175; F25D 25/025; F25D 23/028; F25D 23/04; F25D 11/02
USPC .................. 312/330.1, 348.4, 402, 404, 408
See application file for complete search history.

(56) References Cited

U.S. PATENT DOCUMENTS

| | | | | |
|---|---|---|---|---|
| 5,839,806 | A | * | 11/1998 | Liu ........................ A47B 67/04 312/108 |
| 5,921,648 | A | * | 7/1999 | Rong ..................... A47B 95/02 312/263 |
| 8,820,864 | B2 | * | 9/2014 | Crookshanks ......... A47B 95/02 312/213 |
| 2007/0126325 | A1 | * | 6/2007 | Gorz ..................... F25D 25/025 312/404 |
| 2008/0036346 | A1 | * | 2/2008 | Kobayashi ............. A47B 67/04 312/334.1 |
| 2012/0262045 | A1 | * | 10/2012 | Cheng ................... F25D 25/025 312/404 |

FOREIGN PATENT DOCUMENTS

| | | |
|---|---|---|
| CN | 102997595 A | 3/2013 |
| CN | 202928276 U | 5/2013 |
| CN | 203258961 U | 10/2013 |
| CN | 203572135 U | 10/2014 |
| KR | 20100039477 A | 4/2010 |

* cited by examiner

REFRIGERATOR DRAWER AND REFRIGERATOR

CROSS-REFERENCE TO RELATED APPLICATION

The present application is a national phase entry under 35 USC § 371 of International Application PCT/CN2014/092578, filed Nov. 28, 2014, which claims the benefit of and priority to Chinese Patent Application No. 201410462032.3, filed Sep. 11, 2014, the entire disclosures of which are incorporated herein by reference.

TECHNICAL FIELD

The present disclosure relates to a technical field of refrigerators, and more particularly, to a refrigerator drawer and a refrigerator.

BACKGROUND

There are two types of refrigerator drawers conventionally used in refrigerators, namely, a refrigerator drawer of an integral structure as shown in FIG. 1A, and another refrigerator drawer of a split structure as shown in FIG. 1B.

A baffle and a drawer body in the refrigerator drawer of the integral structure shown in FIG. 1A are configured as an integral part, and when the baffle or the drawer body goes wrong, neither of them may be detached to be processed. Moreover, the structure is limited by an injection mold—it is difficult to mold the baffle into a complex shape, which is not conducive to enhance the convenience of using the refrigerator drawer. Various panels of the refrigerator drawer of a split structure shown in FIG. 1B employ a snap structure, and the baffle of the drawer and various side plates of the drawer body adopt a split structure, but the structure requires frequent replacement of injection molds, which brings some trouble to the production; and furthermore, the number of snaps used in this structure is large, and the snap is easy to break and has a high scrap rate, such that it is very easy to damage the snaps during installation or removal of the panels of the drawer body and the baffle, thereby causing the panels of the drawer body and the baffle scrapped.

Therefore, it is necessary to propose a refrigerator drawer that is easy to assemble and disassemble and has a low scrap rate.

SUMMARY

Based on the above problems, the present disclosure proposes a new assembling structure, such that the refrigerator drawer is easy to assemble or disassemble and will not be easily scrapped.

Accordingly, one objective of the present disclosure is to provide a refrigerator drawer having the new assembling structure.

Another objective of the present disclosure is to provide a refrigerator including the above refrigerator drawer.

In order to achieve the above objectives, according to embodiments of a first aspect of the present disclosure, a refrigerator drawer is provided, which includes a drawer body in the shape of a box having a front opening and an upper opening; and a baffle fitted with the drawer body through a detachable snap structure.

For the refrigerator drawer having the new assembling structure according to the present disclosure, the baffle is rotationally assembled with the drawer body through the detachable snap structure, which is easy to assemble and disassemble; moreover, in the refrigerator drawer according to the present disclosure, only the baffle and the drawer body adopt the split structure connected via snaps, which decreases the number of snaps and reduces the scrap rate.

Additionally, the refrigerator drawer according to the above embodiment of the present disclosure further has the following additional technical features.

According to an embodiment of the present disclosure, the detachable snap structure includes: a first groove provided in two sides at a top of the front opening of the drawer body, and a first raised rib or a second groove provided at a bottom of the front opening of the drawer body; and a second raised rib fitted with the first groove, being provided at two sides at a top of the baffle, and a third groove fitted with the first raised rib or a third raised rib fitted with the second groove, being provided at a bottom of the baffle.

After the first groove is fitted with the second raised rib, the baffle is rotated to a predetermined position to fit the first raised rib with the third groove, or fit the second groove with the third raised rib, such that the bottom of the baffle is fitted with the bottom of the front opening of the drawer body to complete the assembly. Such a structure is easy to assemble and disassemble.

According to an embodiment of the present disclosure, a plurality of first grooves, a plurality of second raised ribs, a plurality of first raised ribs or a plurality of second grooves, and a plurality of third grooves or a plurality of third raised ribs are provided.

The plurality of first grooves, the plurality of second raised ribs, the plurality of first raised ribs or the plurality of second grooves, and the plurality of third grooves or the plurality of third raised ribs are provided, in which, preferably, two first grooves are provided and located in the two sides at the top of the front opening of the drawer body respectively; two second raised ribs are provided and located at the top of the two sides of the baffle respectively; three or four first raised ribs or second grooves are provided and distributed at the bottom of the front opening of the drawer body in a parallel and scattered manner; and three or four third grooves or third raise ribs are provided and distributed at the bottom of the baffle in a parallel and scattered manner.

According to an embodiment of the present disclosure, the detachable snap structure includes: a fourth raised rib provided at two sides at a top of the front opening of the drawer body, and a first raised rib or a second groove provided at a bottom of the front opening of the drawer body; and a fourth groove fitted with the fourth raised rib, being provided at two sides at a top of the baffle, and a third groove fitted with the first raised rib or a third raised rib fitted with the second groove, being provided at a bottom of the baffle.

After the fourth raised rib is fitted with the fourth groove, the baffle is rotated to a predetermined position to fit the first raised rib with the third groove, or fit the second groove with the third raised rib, such that the bottom of the baffle is fitted with the bottom of the front opening of the drawer body to complete the assembly. Such a structure is easy to assemble and disassemble.

According to an embodiment of the present disclosure, a plurality of fourth raised ribs, a plurality of fourth grooves, a plurality of first raised ribs or a plurality of second grooves, and a plurality of third grooves or a plurality of third raised ribs are provided.

The plurality of fourth raised ribs, the plurality of fourth grooves, the plurality of first raised ribs or the plurality of second grooves, and the plurality of third grooves or the plurality of third raised ribs are provided, in which, preferably, two fourth raised ribs are provided and located at the two sides at the top of the front opening of the drawer body respectively; two fourth grooves are provided and located in the two sides at the top of the baffle respectively; three or four first raised ribs or second grooves are provided and distributed at the bottom of the front opening of the drawer body in a parallel and scattered manner; and three or four third grooves or third raise ribs are provided and distributed at the bottom of the baffle in a parallel and scattered manner.

According to an embodiment of the present disclosure, the second raised rib or the fourth raised rib is L-shaped.

The L-shaped raised rib may be conveniently inserted into and fitted with the groove, such that the baffle is rotated to the predetermined position through the fit between the L-shaped raised rib and the groove, so as to fit the bottom of the baffle with the bottom of the front opening of the drawer body.

According to an embodiment of the present disclosure, the second groove or the third groove is square or rectangular.

According to an embodiment of the present disclosure, the first raised rib or the third raised rib has a fracture.

The first raised rib or the third raised rib is broken in the middle, such that when the drawer body or the baffle goes wrong, the drawer body may be detached from the baffle easily, which facilitates the disassembly.

According to an embodiment of the present disclosure, a clasping portion protruding outwards is disposed at an outer side of the baffle, and the clasping portion is provided with a plurality of transversely raised ribs protruding outwards, in which the transversely raised rib has an arc shape.

The clasping portion is disposed at the outer side of the baffle to push or pull the refrigerator drawer conveniently, and the clasping portion is provided with the transversely raised rib to improve aesthetics of the shape. An edge of the front side of the baffle may also be provided with a boss to generate a shrink-resistant effect on the front side.

Embodiments of a second aspect of the present disclosure provide a refrigerator, in which at least one of a freezing chamber and a refrigerating chamber of the refrigerator is internally provided with the refrigerator drawer according to the embodiments of the first aspect of the present disclosure.

The refrigerator according to the embodiments of the second aspect of the present disclosure has the refrigerator drawer according to the embodiments of the first aspect of the present disclosure, so the refrigerator has all the advantageous effects of the refrigerator drawer provided by any one of the above embodiments, which will not be elaborated again.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1A:
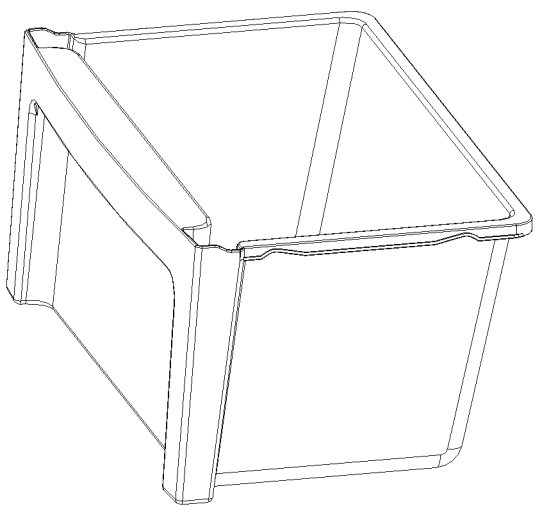
FIG. 1A shows a refrigerator drawer of an integral structure in the prior art.
Figure 1B:
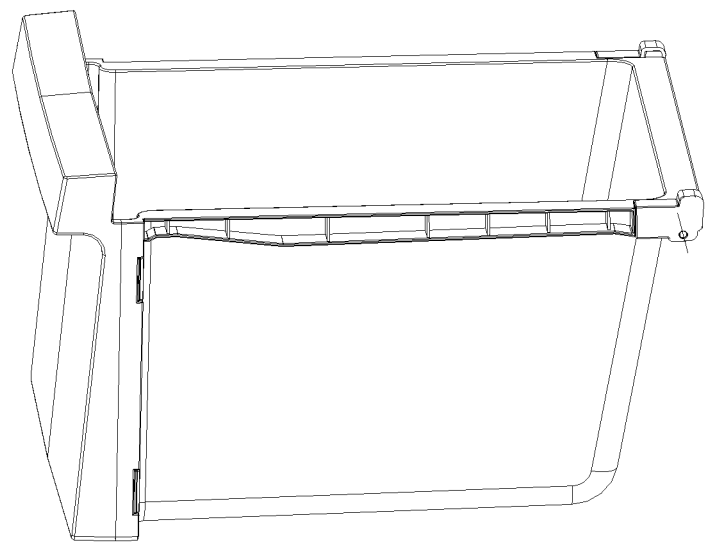
FIG. 1B shows a refrigerator drawer of a split structure in the prior art.

Correspondence between reference numerals and component names in FIGS. 2 to 6:

100 refrigerator drawer, 1 drawer body, 11 first groove, 12 second groove, 14 upper opening, 16 front opening, 2 baffle, 21 second raised rib, 22 clasping portion, 221 transversely raised rib, 24 third raised rib, 241 fracture.

DETAILED DESCRIPTION

In order to understand the above objectives, features and advantages of the present invention more clearly, the present disclosure will be described in further detail with reference to the accompanying drawings and specific embodiments. It should be noted that embodiments and features therein of the present application may be combined with each other without conflict.

The following description illustrates many details to fully understand the present disclosure, but the present disclosure may be implemented in other manners different from those described herein. Thus, the protection scope of the present disclosure is not limited by the specific embodiments disclosed below.

A refrigerator drawer 100 provided according to an embodiment of the present disclosure will be described below with reference to FIGS. 2 to 6.

Figure 2:
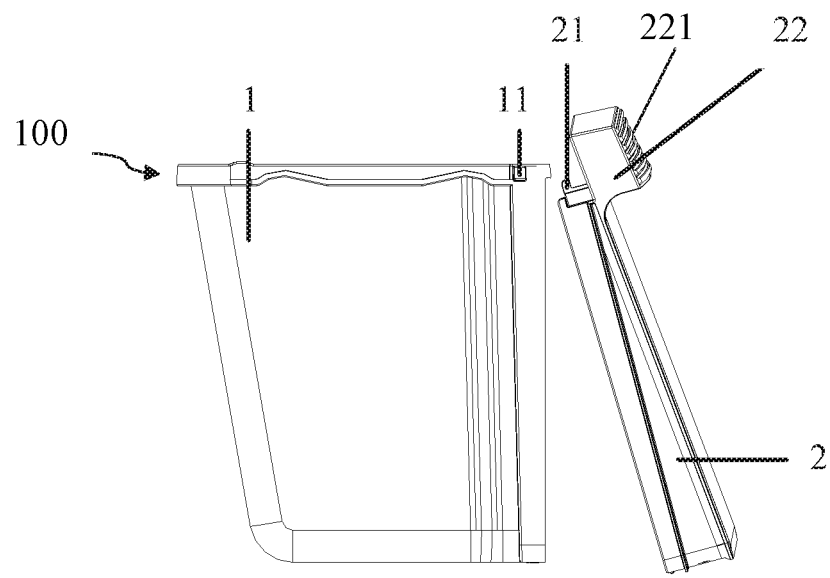
FIG. 2 is an assembling diagram of a refrigerator drawer according to an embodiment of the present disclosure.

The refrigerator drawer 100 shown in FIG. 2 includes a drawer body 1 and a baffle 2, in which the drawer body 1 is in the shape of a box having a front opening 16 and an upper opening 14, and the baffle 2 is fitted with the drawer body 1 through a detachable snap structure. The snap structure is specifically as follows: a first groove 11 is provided in two sides at a top of the front opening 16 of the drawer body 1; a second raised rib 21 fitted with the first groove 11 is disposed at two sides at a top of the baffle 2; when the baffle 2 is at an angle to the drawer body 1, the second raised rib 21 at the two sides at the top of the baffle 2 may be inserted into the first groove 11 in the two sides at the top of the front opening 16 of the drawer body 1; after the second raised rib 21 is inserted into the first groove 11, the baffle 2 is rotated by a certain angle to complete the assembly with the drawer body 1, that is, only after the baffle 2 is rotated by a certain angle, the drawer body 1 and the baffle 2 may be combined together to constitute the refrigerator drawer 100.

Figure 3:
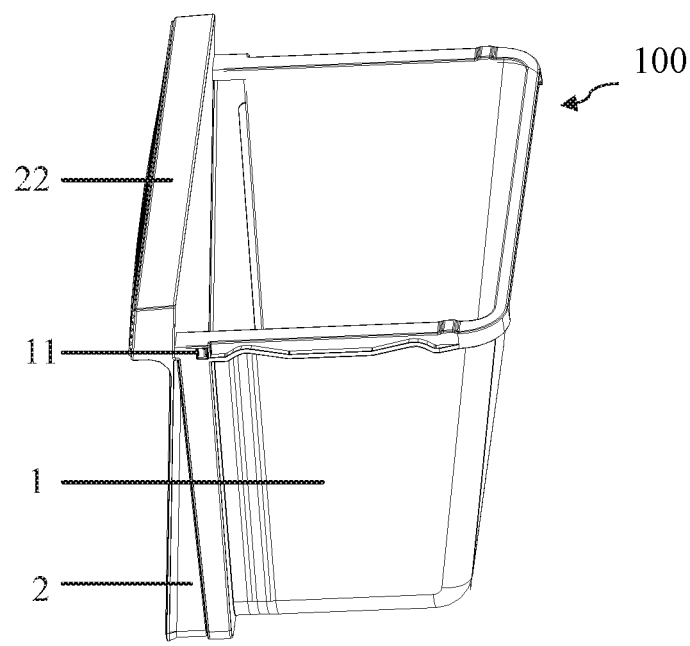
FIG. 3 is a schematic view of the refrigerator drawer in FIG. 2 after assembled.

After the completion of the assembly, the refrigerator drawer 100 is as shown in FIG. 3, in which the drawer body 1 and the baffle 2 are combined together, and a top of a side of the drawer body 1 is only provided with the first groove 11 for rotational installation. Additionally, three sides of the drawer body 1 are provided with different grooves to make a front end of the drawer body 1 configured to be as vertical as possible. Thus, the baffle 2 is rotationally assembled with the drawer body 1 through the detachable snap structure, which is easy to assemble and disassemble; moreover, in the refrigerator drawer 100 according to this embodiment, only the baffle 2 and the drawer body 1 adopt the split structure connected by the snap structure, which decreases the number of snaps and reduces the scrap rate.

Figure 4:
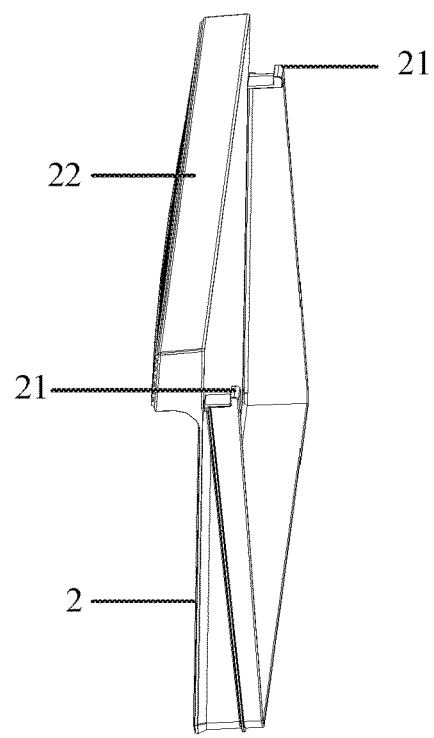
FIG. 4 is a schematic view of a baffle of the refrigerator drawer in FIG. 2.

FIG. 4 shows the baffle 2, and a clasping portion 22 at a front side of the baffle 2 is provided with a structure in the shape of a transversely raised rib 221 that may have an arc shape. The clasping portion 22 is disposed at an outer side of the baffle 2 to push or pull the refrigerator drawer 100 conveniently, and the clasping portion is provided with the transversely raised rib 221 to improve aesthetics of the shape. Three edges of the front side of the baffle 2 are provided with a boss and have a large arc shape, so as to generate a shrink-resistant effect on the front side. The second raised rib 21 at the top of the baffle 2 is L-shaped, such that the L-shaped raised rib may be inserted into the first groove 11 conveniently and fitted with the first groove 11, and may be rotated to a predetermined position conveniently to fit a bottom of the baffle 2 with a bottom of the front opening 16 of the drawer body 1. This kind of L-shaped snap structure is rotationally installed in place when assembled with the drawer body 1, that is, the baffle 2 must be tilted by a certain angle first, the L-shaped second raised rib 21 gives way to contact the first groove 11 at the top of the drawer body 1, and then the baffle 2 is rotated until a snap at the bottom of the baffle 2 is snapped into a square or a rectangular groove of the drawer body 1.

Figure 5:
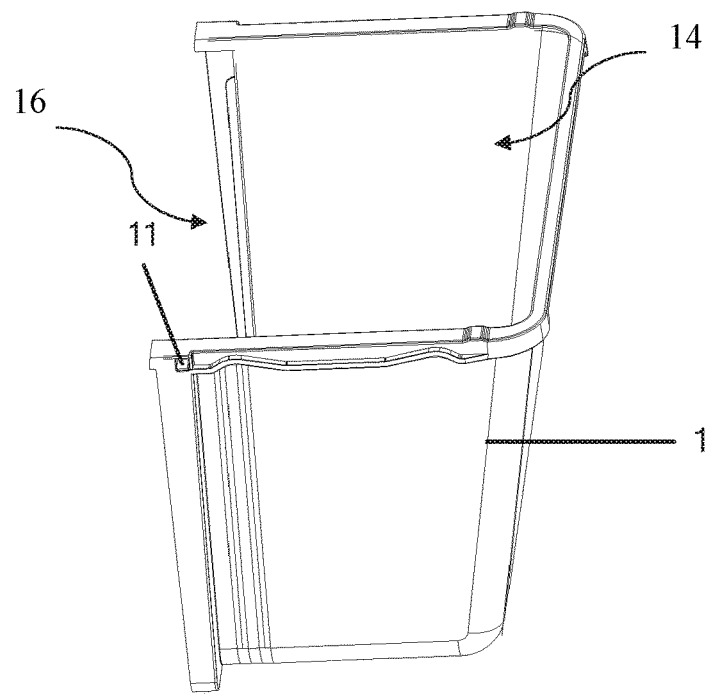
FIG. 5 is a schematic view of a drawer body of the refrigerator drawer in FIG. 2.

FIG. 5 shows the drawer body 1, and the front side of the drawer body 1 is substantially vertical. The two sides at the top of the front opening 16 of the drawer body 1 have the first groove 11 configured to be fitted with the L-shaped second raised rib 21 of the baffle 2.

Figure 6:
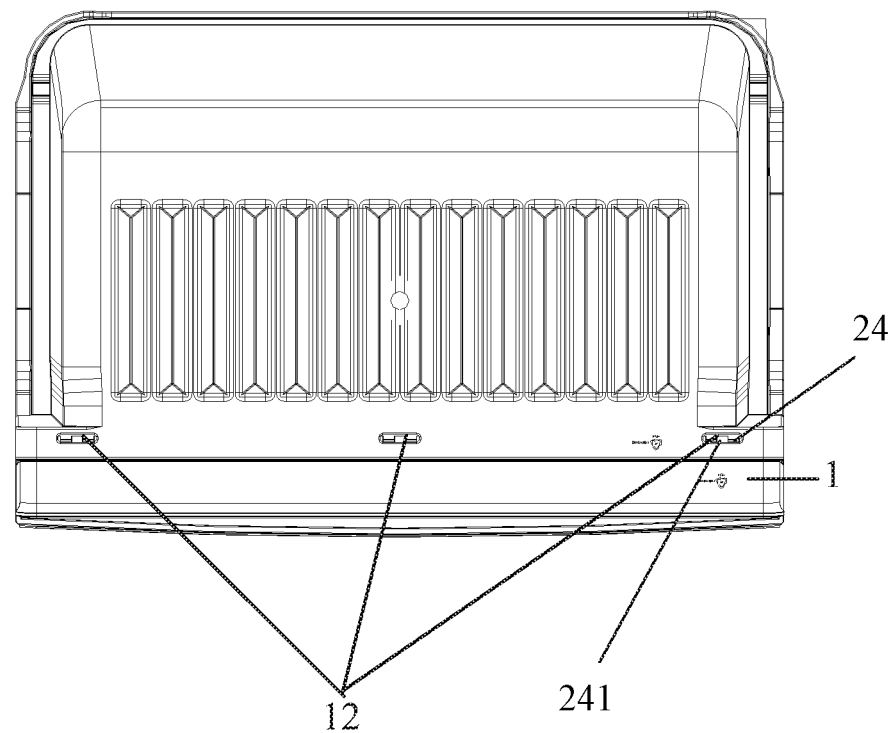
FIG. 6 is a schematic view of a bottom of a front opening of the drawer body of the refrigerator drawer in FIG. 2.

As shown in FIG. 6, a second groove 12 at the bottom of the front opening 16 of the drawer body 1 may be fitted with a third raised rib 24 at the bottom of the baffle 2; after the second raised rib 212 is inserted into the first groove 11, the baffle 2 is rotated by a certain angle to insert the third raised rib 24 at the bottom of the baffle 2 into the second groove 12 at the bottom of the front opening 16 of the drawer body 1, thereby completing the assembly with the drawer body 1.

The second groove 12 may be square or rectangular, and the third raised rib 24 is broken in the middle, that is, the third raised rib 24 has a fracture 241, such that when the drawer body 1 or the baffle 2 goes wrong, the drawer body 1 may be detached from the baffle 2 easily, which facilitates the disassembly.

According to an embodiment of the present disclosure, a plurality of first grooves 11, a plurality of second grooves 12, a plurality of second raised ribs 21 and a plurality of third raised ribs 24 are provided.

The plurality of first grooves 11, the plurality of second grooves 12, the plurality of second raised ribs 21 and the plurality of third raised ribs 24 are provided, in which, preferably, two first grooves 11 are provided and disposed in the two sides at the top of the front opening 16 of the drawer body 1 respectively; two second raised ribs 21 are provided and disposed at the two sides at the top of the baffle 2 respectively; three or four second grooves 12 are provided and distributed in the bottom of the front opening 16 of the drawer body 1 in a parallel and scattered manner; and three or four third raised ribs 24 are provided and distributed at the bottom of the baffle 2 in a parallel and scattered manner.

In addition, according to an embodiment of the present disclosure, the snap structure may also be configured as follows: the first groove is disposed in the two sides at the top of the front opening of the drawer body, and a first raised rib is disposed at the bottom of the front opening of the drawer body; the second raised rib fitted with the first groove is disposed at the two sides at the top of the baffle, and a third groove fitted with the first raised rib is disposed in the bottom of the baffle.

After the first groove is fitted with the second raised rib, the baffle is rotated to the predetermined position to fit the first raised rib with the third groove, such that the bottom of the baffle is fitted with the bottom of the front opening of the drawer body. Such a structure is easy to assemble and disassemble.

According to an embodiment of the present disclosure, the plurality of first grooves, the plurality of second raised ribs, a plurality of first raised ribs and a plurality of third grooves are provided.

The plurality of first grooves, the plurality of second raised ribs, the plurality of first raised ribs and the plurality of third grooves are provided, in which, preferably, two first grooves are provided and disposed in the two sides at the top of the front opening of the drawer body respectively; two second raised ribs are provided and disposed at the two sides at the top of the baffle respectively; three or four first raised ribs are provided and distributed at the bottom of the front opening of the drawer body in a parallel and scattered manner; and three or four third grooves are provided and distributed in the bottom of the baffle in a parallel and scattered manner.

According to an embodiment of the present disclosure, the snap structure may also be configured as follows: a fourth raised rib is disposed at the two sides at the top of the front opening of the drawer body, and the first raised rib or the second groove is disposed at the bottom of the front opening of the drawer body; a fourth groove fitted with the fourth raised rib is disposed in the two sides at the top of the baffle, and the third groove fitted with the first raised rib or the third raised rib fitted with the second groove is disposed at the bottom of the baffle.

After the fourth raised rib is fitted with the fourth groove, the baffle is rotated to the predetermined position to fit the first raised rib with the third groove, or fit the second groove with the third raised rib, such that the bottom of the baffle is fitted with the bottom of the front opening of the drawer body. Such a structure is easy to assemble and disassemble.

According to an embodiment of the present disclosure, a plurality of fourth raised ribs, a plurality of fourth grooves, the plurality of first raised ribs or the plurality of second grooves, and the plurality of third grooves or the plurality of third raise ribs are provided.

The plurality of fourth raised ribs, the plurality of fourth grooves, the plurality of first raised ribs or the plurality of second grooves, and the plurality of third grooves or the plurality of third raise ribs are provided, in which, preferably, two fourth raised ribs are provided and located at the two sides at the top of the front opening of the drawer body respectively; two fourth grooves are provided and located in the two sides at the top of the baffle respectively; three or four first raised ribs or second grooves are provided and distributed at the bottom of the front opening of the drawer body in a parallel and scattered manner; and three or four third grooves or third raise ribs are provided and distributed at the bottom of the baffle in a parallel and scattered manner.

In the present disclosure, terms such as "first," "second," "third" and "fourth" are used herein for purposes of description and are not intended to indicate or imply relative importance or significance; the term "a plurality of" means two or more than two; the terms "connected," "coupled" and the like are used broadly, and may be, for example, fixed connections, detachable connections, or integral connections; may also be direct connections or indirect connections via intervening structures, which can be understood by those skilled in the art according to specific situations.

The technical solutions of the present disclosure are illustrated in combination with the drawings. For the refrigerator drawer according to the present disclosure, the baffle and the drawer body may be rotationally assembled through the detachable snap structure, which is easy to assemble and disassemble; moreover, in the refrigerator drawer according to the present disclosure, only the baffle and the drawer body adopt the split structure connected via snaps, which decreases the number of snaps and reduces the scrap rate.

The above description only elaborates the embodiments of the present disclosure, and shall not be construed to limit the present disclosure. It could be appreciated by those skilled in the art that the present disclosure may have various modifications and changes. Any modifications, alternatives and improvements made without departing from the spirit and principles of the present disclosure are included in the protection scope of the present disclosure.

What is claimed is:

1. A refrigerator drawer, comprising:
   a drawer body in the shape of a box having a front opening and an upper opening; and
   a baffle fitted with the drawer body through a detachable snap structure, wherein the detachable snap structure comprises:
   a first groove provided in two sides at a top of the front opening of the drawer body, and a second groove provided at a bottom of the front opening of the drawer body; and
   a second raised rib fitted with the first groove, being provided at two sides at a top of the baffle, and a third raised rib fitted with the second groove, being provided at a bottom of the baffle,
   wherein a clasping portion protruding outwards is disposed at an outer side of the baffle, and the clasping portion is provided with a plurality of transversely raised ribs protruding outwards, in which the transversely raised rib has an arc shape.

2. The refrigerator drawer according to claim 1, wherein a plurality of first grooves, a plurality of second raised ribs, a plurality of second grooves, and a plurality of third raised ribs are provided.

3. The refrigerator drawer according to claim 2, wherein the second raised rib is L-shaped.

4. The refrigerator drawer according to claim 1, wherein the second groove is square or rectangular.

5. The refrigerator drawer according to claim 1, wherein the third raised rib has a fracture.

* * * * *